United States Patent
Alexandrovichserov et al.

(10) Patent No.: US 7,923,171 B2
(45) Date of Patent: Apr. 12, 2011

(54) CATHODE CATALYST FOR FUEL CELL, AND MEMBRANE-ELECTRODE ASSEMBLY FOR FUEL CELL AND FUEL CELL SYSTEM INCLUDING SAME

(75) Inventors: Alexey Alexandrovichserov, Yongin-si (KR); Chan Kwak, Yongin-si (KR); Si-Hyun Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1120 days.

(21) Appl. No.: 11/655,783

(22) Filed: Jan. 18, 2007

(65) Prior Publication Data
US 2007/0190397 A1 Aug. 16, 2007

(30) Foreign Application Priority Data
Jan. 18, 2006 (KR) .................. 10-2006-0005465
Mar. 31, 2006 (KR) .................. 10-2006-0029468

(51) Int. Cl.
*H01M 4/90* (2006.01)
*H01M 4/92* (2006.01)
*H01M 4/62* (2006.01)
*B01J 27/057* (2006.01)
*B01J 27/02* (2006.01)
*B01J 27/045* (2006.01)

(52) U.S. Cl. ........ 429/526; 429/524; 429/532; 502/215; 502/216; 502/223

(58) Field of Classification Search .......... 429/400–535; 502/215, 216, 223
See application file for complete search history.

(56) References Cited

U.S. PATENT DOCUMENTS

| 3,755,423 | A | 8/1973 | Onoda et al. |
| 4,486,547 | A | 12/1984 | Imai et al. |
| 2004/0096728 | A1* | 5/2004 | Campbell ............... 429/40 |
| 2004/0142230 | A1 | 7/2004 | Katori et al. |

FOREIGN PATENT DOCUMENTS

| DE | 100 52 189 A 1 | 5/2002 |
| JP | 62-269749 | 11/1987 |
| JP | 8-22827 | 1/1996 |
| JP | 2001-502467 | 2/2001 |

(Continued)

OTHER PUBLICATIONS

Alonso-Vante et al., The structure analysis of the active centers of Ru-containing electrocatalysts for the oxygen reduction. An in situ EXAFS study., Aug. 2002, vol. 47, pp. 3807-3814.*

(Continued)

*Primary Examiner* — Basia Ridley
*Assistant Examiner* — Jonathan G Leong
(74) *Attorney, Agent, or Firm* — Christie, Parker & Hale, LLP

(57) ABSTRACT

A cathode catalyst of the present invention includes an A-B-Ch compound, where A is a metal selected from the group consisting of Pt, Ru, Rh, and combinations thereof, B is a metal selected from the group consisting of Bi, Pb, Tl, Sb, Sn, In, Ga, Ge, and combinations thereof, and Ch is an element selected from the group consisting of S, Se, Te, and combinations thereof. The cathode catalyst may be used in a membrane-electrode assembly and a fuel cell.

28 Claims, 4 Drawing Sheets

FOREIGN PATENT DOCUMENTS

| JP | 2005-87989 | 4/2005 |
|---|---|---|
| JP | 2005-322430 | 11/2005 |
| JP | 2006-501983 | 1/2006 |
| KR | 10-2004-0012834 | 2/2004 |

OTHER PUBLICATIONS

Patent Abstracts of Japan, Publication No. 08-022827, dated Jan. 23, 1996, in the name of Tadanori Maoka.

Patent Abstracts of Japan, Publication No. 2005-087989, dated Apr. 7, 2005, in the name of Masatoshi Sugimasa et al.

SIPO Office Action dated May 8, 2009, in corresponding Chinese Patent Application No. 200710003626.8, noting listed reference in this IDS.

European Search Report dated Jun. 1, 2007, for EP 07100724.9, in the name of Samsung SDI Co., Ltd.

Fürcht, A., et al., *n-Octane reforming over modified catalysts I. The role of Sn, Te and Bi under industrial conditions*, Applied Catalysts A: General, vol. 226, (2005), pp. 155-161, XP 4335969.

Ordoñez-Regil, E., et al., *Surface modification of electrodeposited p-CuInSe$_2$ thin films with selenium and ruthenium*, Journal of Materials Science, vol. 31, Oct. 1996, pp. 5347-5350.

Bron, M., et al., *Influence of selenium on the catalytic properites of ruthenium-based cluster catalysts for oxygen reduction*, Journal of Electroanalytical Chemistry, vol. 500, Mar. 2001, pp. 510-517.

Schmidt, T.J., et al, *Oxygen Reduction on $Ru_{1.92}Mo_{0.08}SeO_4$, Ru/Carbon, and Pt/Cargbon in Pure and Methanol-Containing Electrolytes*, Journal of Electrochemical Society, vol. 147, No. 7, Jul. 2000, pp. 2620-2624.

Suárez-Alcántara, K., et al., *$Ru_xCr_ySe_z$ electrocatalyst for oxygen reduction in a polymer electrolyte membrane fuel cell*, Journal of Power Sources, vol. 157, (2006), pp. 114-120, XP 5685205.

Reeve, R.W. et al., *Methanol Toelrant Oxygen Reduction Catalysts Based on Transition Metal Sulfides*, J. Clectrochem. Soc., vol. 145, No. 10, Oct. 1998, pp. 3463-3471.

Patent Abstracts of Japan and English machine translation of Japanese Publication 2005-322430 listed above, 18 pages.

\* cited by examiner

CATHODE CATALYST FOR FUEL CELL, AND MEMBRANE-ELECTRODE ASSEMBLY FOR FUEL CELL AND FUEL CELL SYSTEM INCLUDING SAME

CROSS-REFERENCE TO RELATED APPLICATIONS

This application claims priority to and the benefit of Korean Patent Application Nos. 10-2006-0005465 and 10-2006-0029468 filed in the Korean Intellectual Property Office on Jan. 18, 2006 and Mar. 31, 2006, respectively, the entire contents of which are incorporated herein by reference.

BACKGROUND OF THE INVENTION

1. Field of the Invention

The present invention relates to a cathode catalyst for a fuel cell and a membrane-electrode assembly and a fuel cell system including the same.

2. Description of the Related Art

A fuel cell is a power generation system for producing electrical energy through an electrochemical redox reaction of an oxidant and hydrogen in a hydrocarbon-based material such as methanol, ethanol, and natural gas.

Representative exemplary fuel cells include a polymer electrolyte membrane fuel cell (PEMFC) and a direct oxidation fuel cell (DOFC). The direct oxidation fuel cell includes a direct methanol fuel cell that uses methanol as a fuel.

The polymer electrolyte fuel cell has an advantage of high energy density, but it also has problems in the need to carefully handle hydrogen gas and the requirement of accessory facilities, such as a fuel reforming processor, for reforming methane or methanol, natural gas, and the like in order to produce hydrogen as the fuel gas.

On the contrary, a direct oxidation fuel cell has a lower energy density than that of the polymer electrolyte fuel cell, but it has the advantages of easy handling of a fuel, being capable of operating at room temperature due to its low operation temperature, and no need for additional fuel reforming processors.

In the above fuel cell, the stack that generates electricity substantially includes several to many unit cells stacked in multi-layers, and each unit cell is formed of a membrane-electrode assembly (MEA) and a separator (also referred to as a bipolar plate). The membrane-electrode assembly has an anode (also referred to as a fuel electrode or an oxidation electrode) and a cathode (also referred to as an air electrode or a reduction electrode) attached to each other with an electrolyte membrane between them.

A fuel is supplied to an anode and adsorbed on catalysts of the anode, and the fuel is oxidized to produce protons and electrons. The electrons are transferred into a cathode via an external circuit, and the protons are also transferred into the cathode through the polymer electrolyte membrane. In addition, an oxidant is supplied to the cathode, and then the oxidant, protons, and electrons are reacted on catalysts of the cathode to produce electricity along with water.

SUMMARY OF THE INVENTION

An embodiment of the present invention provides a cathode catalyst for a fuel cell having high activity and selectivity for an oxidant reduction reaction.

Another embodiment of the present invention provides a membrane-electrode assembly that includes the above cathode catalyst.

Yet another embodiment of the present invention provides a fuel cell system that includes the membrane-electrode assembly.

According to an embodiment of the present invention, a cathode catalyst is provided, which includes a A-B-Ch compound, where A is a metal selected from the group consisting of Pt, Ru, Rh, and combinations thereof, B is a metal selected from the group consisting of Bi, Pb, Tl, Sb, Sn, In, Ga, Ge, and combinations thereof, and Ch is an element selected from the group consisting of S, Se, Te, and combinations thereof.

According to another embodiment of the present invention, a method of preparing the cathode catalyst, which includes adding an A element-containing source and a B element-containing source to a solvent to prepare a mixture; performing a first drying of the mixture to prepare an A-B-containing compound powder; mixing the powder with a Ch-containing substance and performing a second drying; and subjecting the dried product to heat treatment.

According to another embodiment of the present invention, a membrane-electrode assembly is provided, which includes a cathode and an anode facing each other, and an electrolyte interposed therebetween. The cathode includes the above cathode catalyst.

According to an embodiment of the present invention, a fuel cell system is provided, which includes at least one electricity generating element, a fuel supplier, and an oxidant supplier. The electricity generating element includes a membrane-electrode assembly and separators arranged at each side thereof. The membrane-electrode assembly includes a cathode, an anode, and a polymer electrolyte membrane interposed therebetween. The cathode includes the above cathode catalyst.

DETAILED DESCRIPTION

Figure 1:
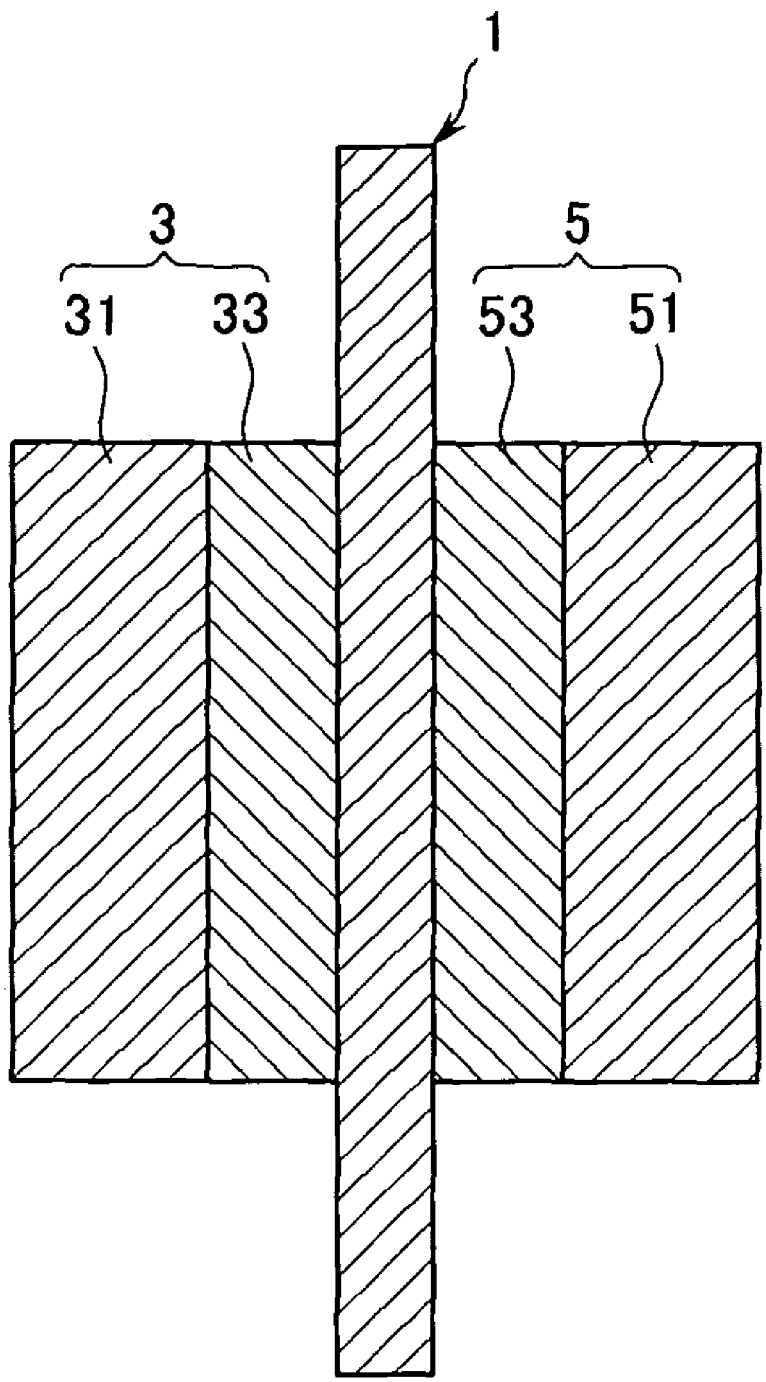
FIG. 1 is a schematic cross-sectional view showing a membrane-electrode assembly according to one embodiment of the present invention.

A fuel cell is a power generation system for generating electrical energy through oxidation of a fuel and reduction of an oxidant. The oxidation of a fuel occurs at an anode, while the reduction of an oxidant occurs at a cathode.

Both of the anode and the cathode include a catalyst layer that includes a catalyst to increase the oxidation of a fuel and the reduction of an oxidant. The catalyst for the anode catalyst layer representatively includes platinum-ruthenium, while that for the cathode catalyst layer may include platinum.

However, platinum as a cathode catalyst has bad selectivity to the reduction reaction of an oxidant. It may also be depolarized by a fuel that crosses over toward a cathode through an electrolyte membrane, and thereby become deactivated in a direct oxidation fuel cell. Therefore, more attention has been paid to other catalysts that can substitute for platinum.

The cathode catalyst according to one embodiment of the present invention includes a A-B-Ch compound where A is a metal selected from the group consisting of Pt, Ru, Rh, and combinations thereof, B is a metal selected from the group consisting of Bi, Pb, Tl, Sb, Sn, In, Ga, Ge, and combinations thereof, and Ch is an element selected from the group consisting of S, Se, Te, and combinations thereof. The cathode catalyst according to another embodiment of the present invention includes a Ru—In-Ch compound.

The A of the A-B-Ch compound is a platinum-based element selected from the group consisting of Pt, Ru, Rh, and combinations thereof that have high activity for an oxidant reduction reaction. However, the A absorbs oxygen in the air and easily binds with oxygen, then the bound oxygen blocks the active center of the A where the oxidant is reduced. Thereby, it is difficult to perform the reduction reaction, and an oxidation reaction of the fuel is promoted.

The B is a metal selected from the group consisting of Bi, Pb, Tl, Sb, Sn, In, Ga, Ge, and a combination thereof and shows various electrical characteristics. The B is bonded with the A by one of its electrical characteristics to provide a cluster bond. In the cluster bond, the bond length is very short so the electrons are rapidly transported between metals and have a high surface energy. Thereby, it increases both the activity to the reduction reaction of the oxidant and the stability of the metal in the acidic electrolyte. In addition, Bi, Pb, Tl, Sb, Sn, In, and Ga have p electrons which are readily transferred into Ru thereby increasing the catalytic activity of Ru.

Further, the Ch is an element selected from the group consisting of S, Se, Te, and a combination thereof, and plays a role of preventing oxygen in the air from binding with A. Thereby, the A acts to activate the reduction reaction of the oxidant and inhibit the oxidation reaction of the fuel.

The cathode catalyst has high activity and selectivity with respect to the reduction reaction of the oxidant and is not inactivated by the fuel.

According to one embodiment, the A-B-Ch compound includes 30 to 60 atomic % of A, 30 to 40 atomic % of B, and 5 to 40 atomic % of Ch.

When the composition falls outside of the range, the particle size may be increased, causing deterioration of the catalyst activity to the reduction reaction of the oxidant.

When the A amount is less than 30 atomic %, the catalyst center is smaller to decrease the catalyst activity, but when it is more than 60 atomic %, the selectivity is deteriorated. Furthermore, when the B amount is less than 30 atomic %, the electron donor amount is insufficient to therefore deteriorate the activity, but when it is more than 40 atomic %, the stability of the A-B alloy is deteriorated. When the Ch amount is less than 5 atomic %, the active part is not protected, thus deteriorating the selectivity, but when it is more than 40 atomic %, the stability of the compound is deteriorated.

The A-B-Ch compound is supported by a supporter. The supporter improves the electrical conductivity to the A-B-Ch compound and prevents agglomeration of the A-B-Ch compound particles to increase the surface area per unit weight, that is, the specific surface area. Further, the activity per unit weight of the catalyst is increased by increasing the specific surface area.

In one embodiment, the supporter may include carbon such as graphite, denka black, ketjen black, acetylene black, carbon nanotubes, carbon nanofiber, carbon nanowire, carbon nanoballs, or activated carbon, or an inorganic particulate such as alumina, silica, zirconia, and titania. Carbon can be generally used.

In one embodiment, the A-B-Ch compound may be supported in an amount of 5 to 90 wt % with respect to the sum of the compound and the supporter. According to another embodiment, the A-B-Ch compound may be supported in an amount of 5 to 75 wt % with respect to the sum of the compound and the supporter. According to yet another embodiment, the A-B-Ch compound may be supported in an amount of 30 to 80 wt % with respect to the sum of the compound and the supporter.

When the supported amount is less than 5 wt %, the activity of the catalyst per unit mass is overly deteriorated, and when it is more than 90 wt %, the catalyst particle is aggregated to deteriorate the activity.

The A-B-Ch compound may form in an amorphous state as well as a crystalline state. The cathode catalyst according to one embodiment of the present invention includes both crystalline A-B-Ch and amorphous A-B-Ch. In the other words, it may include both crystalline A-B-Ch and amorphous A-B-Ch since a plurality of defects are generated at the interface between crystalline and amorphous states, which are more present in the active site. These effect may be obtained from the Ru—In-Ch compound.

The particle diameter of the carbon-based material powder is not sensitive and does not have a serious affect on the present invention. Herein, since the particle diameter of the catalyst including A-B-Ch-supported carbon-based material affects the activity and the stability of the catalyst, in one embodiment the particle including the supporter diameter ranges from 10 to 50 nm.

The cathode catalyst may be prepared by a method that includes adding an A element-containing source and a B element-containing source to a solvent to prepare a mixture; performing a first drying of the mixture to prepare an A-B-containing compound powder; mixing the powder with a Ch-containing substance and performing a second drying; and subjecting the dried product to heat treatment.

First, the A-containing source and the B-containing source are added to a solvent to prepare a mixture.

The A-containing source is a water-soluble compound or a salt including an element selected from the group consisting of Pt, Ru, Rh, and combinations thereof. Non-limiting examples of the A-containing source include at least one selected from the group consisting of ruthenium chloride, ruthenium acetyl acetonate, ruthenium nitrozylnitrate, $H_2RhCl_4$, $H_2PtCl_6$, $Pt(CH_3COCHCOCH_3)_2$, and combinations thereof.

The B-containing source is a water-soluble compound or a salt including an element selected from the group consisting of Bi, Pb, Tl, Sb, Sn, In, Ga, Ge, and combinations thereof. Non-limiting examples of the B-containing source include at least one selected from the group consisting of bismuth nitrate, $BiCl_3$, $Pb(NO_3)_3$, $InCl_3$, $GeCl_4$, $Sb(NO_3)_2$, $Sn(NO_3)_2$, $Tl_2(SO)_4$, and combinations thereof.

Non-limiting examples of the solvent may include water or an organic solvent such as toluene, acetone, methanol, ethanol, tetrahydrofuran, and so on.

The mixing ratio of the A element-containing source and the B element-containing source is determined by considering the ratio of each composition of the final catalyst.

Further, if it is required to prepare the catalyst supported in a supporter, the supporter is added to the mixture of the A element-containing source and the B element-containing source.

The supporter may include the same one as in the above, or may be suitably adjusted by considering the supported amount or the supporter amount in the final catalyst.

A first drying process is subjected to the prepared mixture to provide a powder including the A-B containing compound.

In one embodiment, the first drying process may be performed under vacuum at a temperature in the range of 150 to 300° C. According to another embodiment, the temperature is in the range of 200 to 250° C. If the first drying process is performed at less than 150° C., the reaction does not fully occur between the A element-containing compound and the B element-containing compound, but when it is performed at more than 300° C., the catalyst particles are aggregated to increase the particle diameters.

Further, a first preliminary drying process may be further included before the first drying process. The first preliminary drying process may be performed at a temperature in the range of from 70 to 100° C. According to another embodiment, the temperature is in the range of from 80 to 90° C. When the drying temperature is less than 70° C., it may not be fully dried, but when it is more than 100° C., the catalyst particles are aggregated to increase the catalyst particle diameter.

Thereby, it is possible to provide a powder including an A-B containing compound or an A-B containing compound supported by a supporter.

Then, the powder is mixed with a Ch-containing source in a solvent and subjected to a second drying process and the heating treatment to provide a cathode catalyst.

The Ch-containing source is a powder or oxide including an element selected from the group consisting of S, Se, Te, and combinations thereof. Non-limiting examples of the Ch-containing source includes at least one selected from the group consisting of a S powder, a Se powder, a Te powder, $H_2SeO_3$, $H_2SeO_3$, $H_2TeO_3$, and combinations thereof.

The amount of the Ch-containing source added is adjusted by considering the amount of Ch in the final catalyst.

Non-limiting examples of the solvent includes water; alcohol such as methanol, ethanol, and so on; or a mixed solvent thereof.

In addition, it may further include a second preliminary drying process before the secondary drying process.

The secondary drying process and the secondary preliminary drying process are performed in accordance with the same processes as above.

In one embodiment, the secondary drying process is performed at temperature in the range of 150 to 300° C. According to another embodiment, it is performed at 200 to 250° C. When the secondary drying temperature is less than 150° C., the precursor such as the Ch-containing compound and the A-B containing compound, are not fully decomposed, but when it is more than 300° C., the catalyst particles are aggregated to increase the catalyst particle diameter.

in one embodiment, the secondary preliminary drying process may performed at a temperature in the range of from 70 to 100° C. According to another embodiment, it is in the range of from 80 to 90° C. When the secondary preliminary drying process is less than 70° C., it may not be fully dried, but when it more than 100° C., the catalyst particle is aggregated to increase the catalyst particle diameter.

After the secondary drying process, the heat treatment is performed.

In one embodiment, the heat treatment is performed under a reduction atmosphere of hydrogen ($H_2$), nitrogen ($N_2$), or a combination thereof. According to another embodiment, it is carried out under the hydrogen atmosphere.

The heat treatment is performed at a temperature in the range of from 200 to 500° C. In case of A-B—Se and A-B—Te, the heating treatment may be performed at a temperature in the range of from 200 to 300° C., and in case of A-B—S, the heating treatment maybe performed at a temperature in the range of from 300 to 350° C.

When the temperature of the heat treatment is less than 200° C., the reaction may be insufficiently generated between precursors, but when it is more than 500° C., the catalyst particles may be aggregated to increase the particle diameter.

The heat treatment may be performed for between 2 and 6 hours. When the heat treatment duration is less than 2 hours, the reaction may be insufficiently performed, but when it is more than 6 hours, the catalyst particles may be aggregated to increase the particle diameter.

As the A-B-Ch catalyst prepared in accordance with the above procedure has excellent activity and selectivity to the reduction reaction of the oxidant, it can be applied as a cathode catalyst for a fuel cell.

The cathode catalyst may be applied to a polymer electrolyte membrane fuel cell (PEMFC), a direct oxidation fuel cell (DOFC), or a mixed reactant fuel cell. The mixed reactant fuel cell includes a catalyst at an anode catalyst layer, which optionally acts only for oxidation of a fuel, and another catalyst at a cathode catalyst layer, which optionally acts only for reduction of an oxidant. Therefore, even if the fuel and oxidant mixture is provided to the anode and cathode catalyst layers, only oxidation of the fuel occurs at the anode catalyst layer, while only reduction of the oxidant occurs at the cathode catalyst layer.

According to one embodiment of the present invention, since a cathode catalyst has excellent selectivity for reduction of oxygen, it can be more effectively used for a direct oxidation fuel cell having a cross-over problem of a fuel, and most effectively for a direct methanol fuel cell (DMFC).

According to another embodiment of the present invention, a membrane-electrode assembly includes the cathode catalyst.

The membrane-electrode assembly includes an anode and a cathode facing each other, and an electrolyte interposed therebetween. The anode and cathode include a conductive electrode substrate and a catalyst layer disposed thereon.

FIG. 1 is a schematic cross-sectional view showing a membrane-electrode assembly 20 according to one embodiment of the present invention.

The membrane-electrode assembly 20 generates electricity through fuel oxidation and oxidant reduction, and one or more membrane-electrode assembly constitutes a stack.

At the cathode catalyst layer 53 that includes a cathode catalyst, an oxidant reduction reaction occurs. The cathode catalyst has high activity and selectivity for a reduction reaction of an oxidant, and thus can effectively improve performance of the cathode 5 and membrane-electrode assembly 20.

A fuel oxidation reaction occurs at the anode catalyst layer 33 and it includes a general platinum-based catalyst for facilitating the reaction. The platinum-based catalyst may include at least one selected from the group consisting of platinum, ruthenium, osmium, platinum-ruthenium alloys, platinum-osmium alloys, platinum-palladium alloys, platinum-M alloys (where M is a transition element selected from the group consisting of Ga, Ti, V, Cr, Mn, Fe, Co, Ni, Cu, Zn, Sn, Mo, W, Rh, Ru, and combinations thereof), and combinations thereof. More specifically, non-limiting examples of the platinum-based catalyst are selected from the group consisting of Pt, Pt/Ru, Pt/W, Pt/Ni, Pt/Sn, Pt/Mo, Pt/Pd, Pt/Fe, Pt/Cr, Pt/Co, Pt/Ru/W, Pt/Ru/Mo, Pt/Ru/V, Pt/Fe/Co, Pt/Ru/Rh/Ni, Pt/Ru/Sn/W, and combinations thereof.

Such a metal catalyst may be used in the form of a metal itself (black catalyst), or one supported on a supporter. The supporter may include carbon such as graphite, denka black, ketjen black, acetylene black, carbon nanotubes, carbon nanofiber, carbon nanowire, carbon nanoballs, or activated carbon, or an inorganic particulate such as alumina, silica, zirconia, or titania. The carbon can be generally used.

The catalyst layers 33 and 53 of the anode 3 and cathode 5 may include a binder resin to improve its adherence and proton transfer properties.

The binder resin may be proton conductive polymer resins having a cation exchange group at its side chain selected from the group consisting of a sulfonic acid group, a carboxylic acid group, a phosphoric acid group, a phosphonic acid group, and derivatives thereof. Non-limiting examples of the polymer include at least one proton conductive polymer selected from the group consisting of perfluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, and polyphenylquinoxaline-based polymers. In an embodiment, the proton conductive polymer is at least one selected from the group consisting of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), and poly(2,5-benzimidazole).

The binder resins may be used singularly or in combination. They may be used along with non-conductive polymers to improve adherence with a polymer electrolyte membrane. The binder resins may be used in a controlled amount to adapt to their purposes.

Non-limiting examples of the non-conductive polymers include polytetrafluoroethylene (PTFE), tetrafluoroethylene-hexafluoropropylene copolymers (FEP), tetrafluoroethylene-perfluoro alkyl vinylether copolymers (PFA), ethylene/tetrafluoroethylene (ETFE), chlorotrifluoroethylene-ethylene copolymers (ECTFE), polyvinylidenefluoride, polyvinylidenefluoride-hexafluoropropylene copolymers (PVdF-HFP), dodecylbenzenesulfonic acid, sorbitol, and combinations thereof.

The anode and the cathode further include electrode substrates 31 and 51, respectively. The electrode substrates 31 and 51 of the anode and cathode support the anode and cathode, respectively, and provide a path for transferring fuel and oxidant to the catalyst layer 33 and 53. A conductive substrate is used for the electrode substrates 31 and 51, for example carbon paper, carbon cloth, carbon felt, or metal cloth, or a porous film including metal cloth fibers or metalized polymer fibers, but is not limited thereto.

The electrode substrates 31 and 51 may be treated with a fluorine-based resin to be water-repellent to prevent deterioration of diffusion efficiency due to water generated during operation of a fuel cell. In one embodiment, the fluorine-based resin may include polyvinylidene fluoride, polytetrafluoroethylene, fluorinated ethylene propylene, polychlorotrifluoroethylene, or a fluoroethylene polymer.

A microporous layer (MPL, not shown) may be added between the aforementioned electrode substrates 31 and 51 and catalyst layer to increase reactant diffusion effects. The microporous layer generally includes conductive powders with a particular particle diameter. The conductive material may include, but is not limited to, carbon powder, carbon black, acetylene black, activated carbon, carbon fiber, fullerene, nano-carbon, or combinations thereof. The nano-carbon may include a material such as carbon nanotubes, carbon nanofiber, carbon nanowire, carbon nanohorns, carbon nanorings, or combinations thereof.

The microporous layer is formed by coating a composition including a conductive powder, a binder resin, and a solvent on the conductive substrate. The solvent may include, but is not limited to, an alcohol such as ethanol, isopropyl alcohol, n-propyl alcohol, butanol, and so on, water, dimethyl acetamide, dimethyl sulfoxide, or N-methylpyrrolidone The coating method may include, but is not limited to, screen printing, spray coating, doctor blade methods, gravure coating, dip coating, silk screening, painting, and so on, depending on the viscosity of the composition.

The polymer electrolyte membrane 1 plays a role of exchanging ions by transferring protons produced at an anode catalyst layer 33 to a cathode catalyst layer 53.

The proton conductive polymer for the polymer electrolyte membrane of the present invention may be any polymer resin having a cation exchange group at its side chain selected from the group consisting of a sulfonic acid group, a carboxylic acid group, a phosphoric acid group, a phosphonic acid group, and derivatives thereof.

Non-limiting examples of the polymer resin include at least one proton conductive polymer selected from the group consisting of fluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, and polyphenylquinoxaline-based polymers. In one embodiment, the proton conductive polymer is at least one selected from the group consisting of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), and poly(2,5-benzimidazole).

H may be substituted with Na, K, Li, Cs, or tetrabutylammonium in a proton conductive group of the proton conductive polymer. When the H is substituted with Na in an ion exchange group at the terminal end of the proton conductive group, NaOH is used. When the H is substituted with tetrabutylammonium, tributylammonium hydroxide is used. K, Li, or Cs can also be substituted by using appropriate compounds. A method of substituting H is known in the related art, and thereby is not further described in detail.

According to another embodiment of the present invention, a fuel cell system including the above membrane-electrode assembly is provided.

A fuel cell system of the present invention includes at least one of an electricity generating element, a fuel supplier, and an oxidant supplier.

The electricity generating element includes a membrane-electrode assembly that includes a polymer electrolyte membrane and a cathode and an anode positioned at both sides of the polymer electrolyte membrane, and separators positioned at both sides of the membrane-electrode assembly. It generates electricity through oxidation of a fuel and reduction of an oxidant.

The fuel supplier plays a role of supplying the electricity generating element with a fuel including hydrogen, and the oxidant supplier plays a role of supplying the electricity generating element with an oxidant. The oxidant includes oxygen or air.

The fuel includes liquid or gaseous hydrogen, or a hydrocarbon-based fuel such as methanol, ethanol, propanol, butanol, or natural gas.

The fuel cell system may be applied to a polymer electrolyte membrane fuel cell (PEMFC), a direct oxidation fuel cell (DOFC), or a mixed reactant fuel cell. However, since a cathode catalyst has excellent selectivity for reduction of oxygen, it can be more effectively used for a direct oxidation fuel cell having a cross-over problem of a fuel. Thus, the fuel cell system is most effectively applied to a direct methanol fuel cell (DMFC).

The mixed reactant fuel cell includes a catalyst at an anode catalyst layer, which optionally acts only for oxidation of a fuel, and another catalyst at a cathode catalyst layer, which optionally acts only for reduction of an oxidant. Therefore, even if the fuel and oxidant mixture is provided to the anode and cathode catalyst layers, only oxidation of the fuel occurs at the anode catalyst layer, while only reduction of the oxidant occurs at a cathode catalyst layer. Therefore, since the mixed reactant fuel cell does not need a separator which is necessary for a general fuel cell, the present invention can have advantages of decreasing manufacturing cost and down-sizing a fuel cell.

Figure 2:
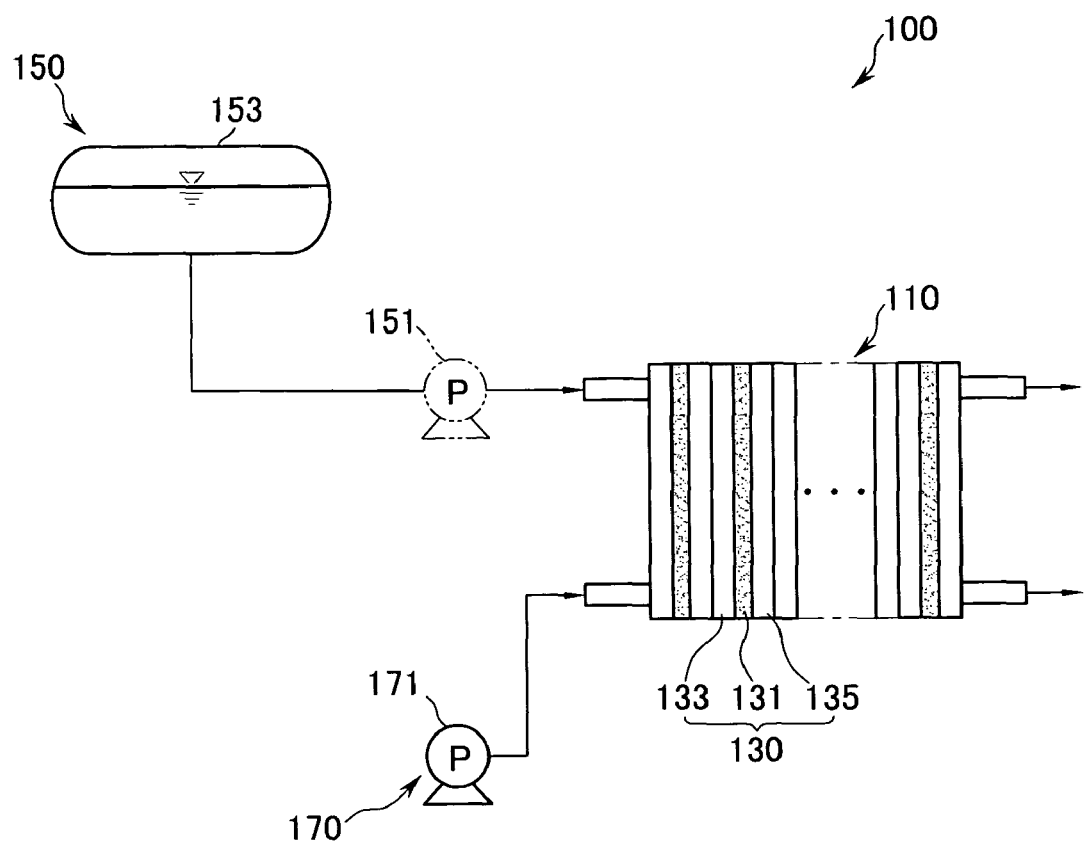
FIG. 2 schematically shows the structure of a fuel cell system according to one embodiment of the present invention.

FIG. 2 shows a schematic structure of a fuel cell system 100 that will be described in detail with reference to this accompanying drawing as follows. FIG. 2 illustrates a fuel cell system wherein a fuel and an oxidant are provided to the electricity generating element 130 through pumps 151 and 171, but the present invention is not limited to such structures. The fuel cell system of the present invention alternately includes a structure wherein a fuel and an oxidant are provided in a diffusion manner.

The fuel cell system 100 includes a stack 110 composed of at least one electricity generating element 130 that generates electrical energy through an electrochemical reaction of a fuel and an oxidant, a fuel supplier 150 for supplying a fuel to the electricity generating element 130, and an oxidant supplier 170 for supplying an oxidant to the electricity generating element 130.

In addition, the fuel supplier 150 is equipped with a tank 153, which stores fuel, and a fuel pump 151, which is connected therewith. The fuel pump 151 supplies fuel stored in the tank 153.

The oxidant supplier 170, which supplies the electricity generating element 130 of the stack 110 with an oxidant, is equipped with at least one pump 171 for supplying an oxidant.

The electricity generating element 130 includes a membrane-electrode assembly 131, which oxidizes hydrogen or a fuel and reduces an oxidant, and separators 133 and 135 that are respectively positioned at opposite sides of the membrane-electrode assembly and supply hydrogen or a fuel, and an oxidant, respectively. At least one electricity generating element 130 constitutes a stack 110.

The following examples illustrate the present invention in more detail. However, it is understood that the present invention is not limited by these examples.

Example 1

2.5 g of ruthenium chloride, 1.7 g of bismuth nitrate, and 1 g of ketjen black were added to 5 ml of anhydrous tetrahydrofuran and mixed for 2 hours to provide a mixture. The mixture was dried at 80° C. and treated under the vacuum at 200° C. for 24 hours to provide a powder. 1 g of the powder and 0.21 g of $H_2SeO_3$ were added to 5 ml of water which was then mixed, dried at 80° C., and treated under vacuum at 200° C. for 24 hours. Subsequently, it was heated at 250° C. under a hydrogen atmosphere for 3 hours to provide a Ru—Bi—Se cathode catalyst supported in ketjen black.

The Ru—Bi—Se active material included 47 atomic % of Ru, 33 atomic % of Bi, and 20 atomic % of Se, and the supported amount of Ru—Bi—Se compound was 55 wt %.

Example 2

2.5 g of ruthenium chloride, 1.7 g of indium chloride, and 1 g of ketjen black were added to 5 ml of water and mixed for 2 hours to provide a mixture. The mixture was dried at 80° C. and treated under vacuum at 200° C. for 24 hours to provide a powder. 1 g of the powder and 0.21 g of $H_2SeO_3$ were added to 5 ml of water which was then dried at 80° C., and treated them under vacuum at 200° C. for 24 hours. Subsequently, it was heated at 250° C. under a hydrogen atmosphere for 3 hours to provide a Ru—In—Se cathode catalyst supported in ketjen black.

The Ru—In—Se compound included 50 atomic % of Ru, 40 atomic % of In, and 10 atomic % of Se, and the supported amount of Ru—In—Se compound was 59 wt %.

Example 3

1 g of graphite powder, 2.5 g of ruthenium chloride, and 1.7 g of indium chloride were added to 5 ml of water and mixed for 2 hours and dried at 80° C. The obtained dry product was dried in a vacuum oven at 200° C. for 24 hours to provide a black powder.

1 g of the black powder and 0.21 g of selenious acid ($H_2SeO_3$) were mixed in 5 ml of water and dried at 80° C. Then, the dried product was further dried in a vacuum oven at 200° C. for 24 hours and calcinated under a hydrogen atmosphere at 250° C. for 3 hours to provide a cathode catalyst for the fuel cell including 55 atomic % of Ru, 35 atomic % of In, and 10 atomic % of Se and the supported amount of Ru—In—Se compound was 50 wt %.

Example 4

2.7 g of ruthenium chloride, 1.2 g of $Sb(NO_3)_2$, and 1 g of ketjen black were added to 5 ml of water and mixed for 2 hours to provide a mixture. The mixture was dried at 80° C. and treated under vacuum at 200° C. for 24 hours to provide a powder. 1 g of the powder and 0.21 g of $H_2SeO_3$ were added to 5 ml of water, dried at 80° C., and treated under vacuum at 200° C. for 24 hours. Subsequently, it was heated at 250° C. under a hydrogen atmosphere for 3 hours to provide a Ru—Sn—Se cathode catalyst supported in ketjen black.

The Ru—Sn—Se compound included 50 atomic % of Ru, 40 atomic % of Sn, and 10 atomic % of Se, and the supported amount of Ru—Sn—Se compound was 60 wt %.

Example 5

1.75 g of ruthenium chloride and 0.7 g of bismuth nitrate were added to 5 ml of water and mixed for 2 hours to provide a mixture. The mixture was dried at 80° C. and treated under the vacuum at 200° C. for 24 hours to provide a powder.

1 g of the powder and 0.21 g of $H_2SeO_3$ were added to 5 ml of water, which was then mixed, dried at 80° C., and treated them under vacuum at 200° C. for 24 hours. Subsequently, it was heated at 250° C. under a hydrogen atmosphere for 3 hours to provide a Ru—Bi—Se cathode catalyst.

The Ru—Bi—Se compound included 41 atomic % of Ru, 40 atomic % of Bi, and 19 atomic % of Se.

Example 6

The same process as in Example 2 was performed, except that the added amounts of ruthenium chloride, indium chloride, and selenious acid were changed to provide a cathode catalyst for the fuel cell that was composed of 40 atomic % of Ru, 30 atomic % of In, and 5 atomic % of Se.

Comparative Example 1

0.6 g of ruthenium carbonyl, 0.03 g of Se powder and 1 g of ketjen black were added into 150 ml of toluene and mixed at 140° C. for 24 hours to provide a mixture. The mixture was filtered and dried at 80° C., then heated under a hydrogen atmosphere at 250° C. for 3 hours to provide a Ru—Se cathode catalyst supported in the ketjen black.

2.7 g of ruthenium chloride, 1.2 g of $Sb(NO_3)_2$, and 1 g of ketjen black were added to 5 ml of water and mixed for 2 hours to provide a mixture. The mixture was dried at 80° C. and treated under vacuum at 200° C. for 24 hours to provide a powder.

The Ru—Se active material included 75 atomic % of Ru and 25 atomic % of Se, and the supported amount of the active material was 47 wt %.

An oxygen saturated sulfuric acid solution was prepared by bubbling an oxygen gas for 2 hours in a 0.5M sulfuric acid solution. Working electrodes were prepared by loading $3.78 \times 10^{-3}$ mg of the catalyst according to Example 1 and $3.78 \times 10^{-3}$ mg of the ruthenium-palladium catalyst according to Comparative Example 1 on glassy carbons, respectively, and a platinum mesh was used as a counter electrode. The working and counter electrodes were put in the sulfuric acid solution and the current density was measured while changing the voltage. The measurement results are shown in Table 1.

TABLE 1

| | Current density ($mA/cm^2$ at 0.6 V) |
|---|---|
| Example 1 | 1.50 |
| Comparative Example 1 | 0.50 |

The results show that the catalyst according to Example 1 had a higher current density than that of Comparative Example 1. From the results, it is confirmed that the catalyst according to Example 1 had much better catalyst activity compared to that of Comparative Example 1.

The current density was determined for catalysts according to Examples 2 to 5 in accordance with the same procedure as above.

Results showed that catalysts according to Examples 2 to 6 had a current density similar to that according to Example 1. Thereby, it is confirmed that catalysts according to Examples 2 to 6 also had excellent catalyst activity.

Figure 3:
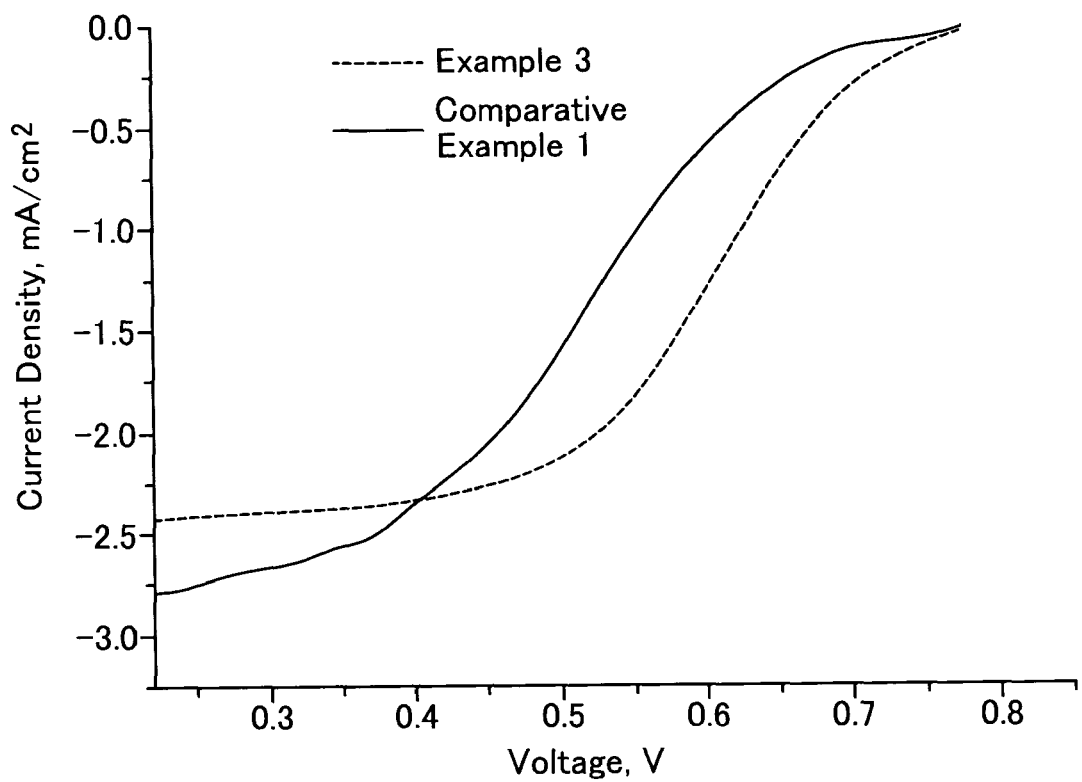
FIG. 3 is a graph showing a measurement result using a rotating disk electrode (RDE) of the cathode catalysts according to Example 2 of the invention and Comparative Example 1.

The catalytic activity of the catalyst according to Example 3 and Comparative Example 1 was measured using a Rotating Disk Electrode (RDE). The RDE analysis was performed with a reference electrode of Ag/AgCl and a counter electrode of Pt by using an oxygen-saturated sulfuric acid solution that was prepared by bubbling oxygen gas for 2 hours in a 0.5M sulfuric acid solution at a 10 mV/s scan rate and a 2000 rpm rotating speed. The results are shown in FIG. 3. As shown in FIG. 3, the catalyst according to Example 3 had much better catalyst activity than that according to Comparative Example 1. Further, same procedure was repeated with catalysts according to Examples 1 to 2, and 4 to 6 and the similar results were obtained to that of Example 3.

Figure 4:
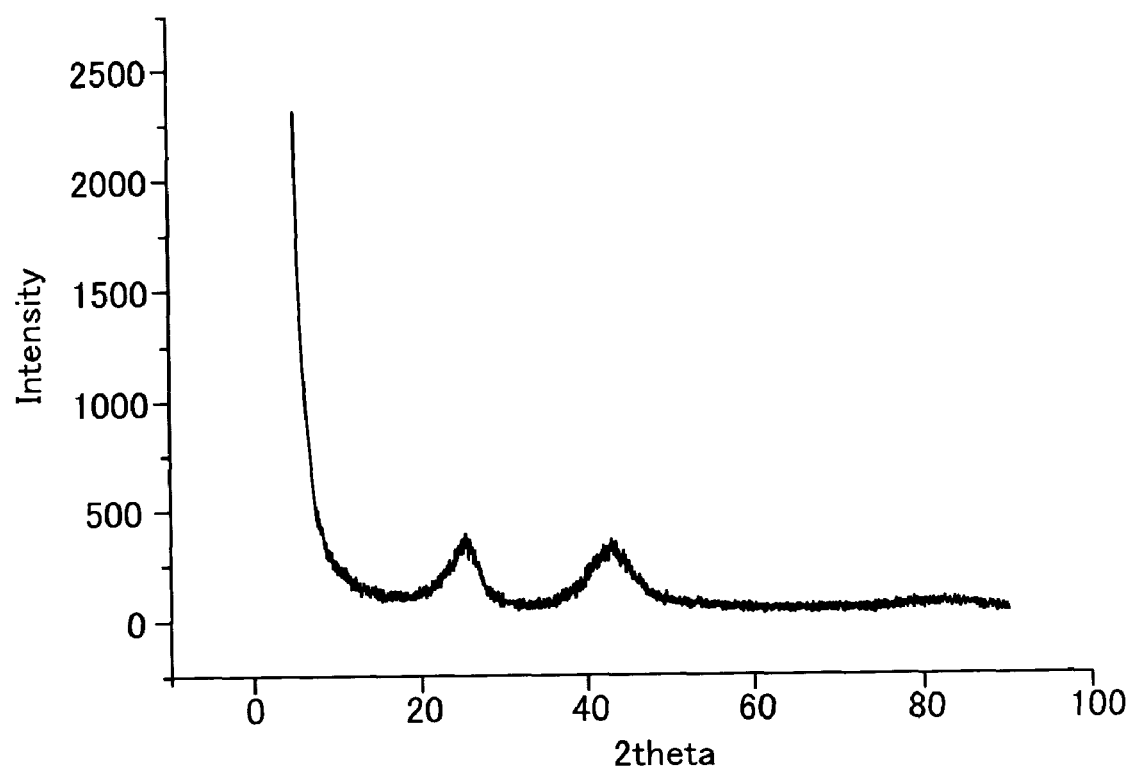
FIG. 4 shows X-ray diffraction peaks of the cathode catalyst according to Example 2 of the present invention.

Further, the catalyst according to Example 3 was measured to determine the X-ray diffraction peak, and the results are shown in FIG. 4. The X-ray diffraction peak was determined by using the CuKα line. As shown in FIG. 4, the X-ray diffraction peak of the catalyst according to Example 3 is not sharply curved, showing that the crystallinity thereof is low.

The cathode catalyst has excellent activity and selectivity to a reduction reaction of the oxidant, and thereby is capable of improving performance of a membrane-electrode assembly and a fuel cell system including the cathode catalyst.

While this invention has been described in connection with what are considered to be exemplary embodiments, it is to be understood that the invention is not limited to the disclosed embodiments, but, on the contrary, is intended to cover various modifications and equivalent arrangements included within the spirit and scope of the appended claims.

What is claimed is:

1. A cathode catalyst comprising an A-B-Ch compound, where A is a metal selected from the group consisting of Pt, Ru, Rh, and combinations thereof, B is a metal selected from the group consisting of Bi, Pb, Tl, Sb, Sn, In, Ga, Ge, and combinations thereof, and Ch is an element selected from the group consisting of S, Se, Te, and combinations thereof.

2. The cathode catalyst of claim 1, wherein the A-B-Ch compound comprises 30 to 60 mol % of A, 30 to 40 mol % of B, and 5 to 40 mol % of Ch.

3. The cathode catalyst of claim 1, wherein the A-B-Ch compound is supported on a supporter.

4. The cathode catalyst of claim 3, wherein the A-B-Ch compound is supported on a supporter in an amount of 5 to 90 wt % based on the sum of the compound and the supporter.

5. The cathode catalyst of claim 4, wherein the A-B-Ch compound is supported on a supporter in an amount of 5 to 75 wt % based on the sum of the compound and the supporter.

6. The cathode catalyst of claim 3, wherein the supporter is selected from the group consisting of carbon, an inorganic material particulate, and a combination thereof.

7. The cathode catalyst of claim 1, wherein A is Ru and B is In.

8. The cathode catalyst of claim 1, wherein the cathode catalyst comprises crystalline Ru—In-Ch and amorphous Ru—In-Ch.

9. The cathode catalyst of claim 1, wherein the cathode catalyst is used in a fuel cell selected from the group consisting of a polymer electrolyte membrane fuel cell, a direct oxidation fuel cell, and a mixed reactant fuel cell.

10. The cathode catalyst of claim 9, wherein the cathode catalyst is used in a direct oxidation fuel cell.

11. A membrane-electrode assembly for a fuel cell, comprising:
a cathode, wherein the cathode comprises a cathode catalyst which includes an A-B-Ch compound, where A is a metal selected from the group consisting of Pt, Ru, Rh, and combinations thereof, B is a metal selected from the group consisting of Bi, Pb, Tl, Sb, Sn, In, Ga, Ge, and combinations thereof, and Ch is an element selected from the group consisting of S, Se, Te, and combinations thereof;
an anode facing the cathode; and
an electrolyte interposed between the anode and cathode.

12. The membrane-electrode assembly of claim 11, wherein the A-B-Ch compound comprises 30 to 60 mol % of A, 30 to 40 mol % of B, and 5 to 40 mol % of Ch.

13. The membrane-electrode assembly of claim 11, wherein the A-B-Ch compound is supported on a supporter.

14. The membrane-electrode assembly of claim 13, wherein the A-B-Ch compound is supported on a supporter in an amount of 5 to 90 wt % based on the sum of the compound and the supporter.

15. The membrane-electrode assembly of claim 14, wherein the A-B-Ch compound is supported on a supporter in an amount of 5 to 75 wt % based on the sum of the compound and the supporter.

16. The membrane-electrode assembly of claim 13, wherein the supporter is selected from the group consisting of carbon, an inorganic material particulate, and a combination thereof.

17. The membrane-electrode assembly of claim 11, wherein the cathode catalyst is Ru—In-Ch.

18. The membrane-electrode assembly of claim 11, wherein the cathode catalyst comprises crystalline Ru—In-Ch and amorphous Ru—In-Ch.

19. A fuel cell system comprising:
a fuel supplier for supplying a fuel to an electricity generating element;
an oxidant supplier for supplying an oxidant to an electricity generating element; and
at least one electricity generating element for generating electricity from electrochemical reactions of a fuel and an oxidant, comprising
a membrane-electrode assembly comprising:
a cathode, wherein the cathode comprises a cathode catalyst which includes an A-B-Ch compound, where A is a metal selected from the group consisting of Pt, Ru, Rh, and combinations thereof, B is a metal selected from the group consisting of Bi, Pb, Tl, Sb, Sn, In, Ga, Ge, and combinations thereof, and Ch is an element selected from the group consisting of S, Se, Te, and combinations thereof;
an anode facing the cathode; and
a polymer electrolyte membrane interposed between the anode and the cathode.

20. The fuel cell system of claim 19, wherein the A-B-Ch compound comprises 30 to 60 mol % of A, 30 to 40 mol % of B, and 5 to 40 mol % of Ch.

21. The fuel cell system of claim 19, wherein the A-B-Ch compound is supported on a supporter.

22. The fuel cell system of claim 21, wherein the A-B-Ch compound is supported on a supporter in an amount of 5 to 90 wt % based on the sum of the compound and the supporter.

23. The fuel cell system of claim 22, wherein the A-B-Ch compound is supported on a supporter in an amount of 5 to 75 wt % based on the sum of the compound and the supporter.

24. The fuel cell system of claim 21, wherein the supporter is selected from the group consisting of carbon, an inorganic material particulate, and a combination thereof.

25. The fuel cell system of claim 19, wherein the cathode catalyst is Ru—In-Ch.

26. The fuel cell system of claim 19, wherein the cathode catalyst comprises crystalline A-B-Ch and amorphous A-B-Ch.

27. The fuel cell system of claim 19, which is selected from the group consisting of a polymer electrolyte membrane fuel cell system, a direct oxidation fuel cell system, and a mixed reactant fuel cell system.

28. The fuel cell system of claim 27, which is a direct oxidation fuel cell system.

* * * * *